United States Patent
Bittles et al.

(10) Patent No.: US 8,805,860 B2
(45) Date of Patent: *Aug. 12, 2014

(54) PROCESSING ENCODED DATA ELEMENTS USING AN INDEX STORED IN A FILE

(75) Inventors: William Bittles, Winchester (GB); Lucas W. Partridge, Southampton (GB)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 13/562,763

(22) Filed: Jul. 31, 2012

(65) Prior Publication Data

US 2012/0296916 A1 Nov. 22, 2012

Related U.S. Application Data

(63) Continuation of application No. 12/176,788, filed on Jul. 21, 2008, now Pat. No. 8,250,115.

(30) Foreign Application Priority Data

Aug. 10, 2007 (EP) .................................... 07114184

(51) Int. Cl.
*G06F 17/30* (2006.01)
(52) U.S. Cl.
USPC .......................................................... 707/755
(58) Field of Classification Search
CPC ................................................ G06F 17/30911
USPC ......................................................... 707/755
See application file for complete search history.

(56) References Cited

U.S. PATENT DOCUMENTS

| | | | |
|---|---|---|---|
| 2004/0028049 A1* | 2/2004 | Wan | 370/394 |
| 2006/0155726 A1* | 7/2006 | Krasun et al. | 707/100 |
| 2006/0168511 A1* | 7/2006 | Bauer et al. | 715/513 |
| 2006/0212799 A1* | 9/2006 | Kamiya | 715/513 |
| 2008/0010256 A1* | 1/2008 | Lindblad et al. | 707/3 |
| 2008/0037789 A1* | 2/2008 | Motohashi | 380/277 |

FOREIGN PATENT DOCUMENTS

WO 2007065207 A1 6/2007

OTHER PUBLICATIONS

Tackgon Kim & Wooseang Kim, "An Efficient XML Index Technique with Relative Position Coordinate", 2005, in Proceedings of WSEAS '05, 7 pages.*
Kasdorf, B., "Indexers and XML: An Overview of the Opportunities," The Indexer [online] vol. 24, No. 2, Oct. 2004, pp. 75-78, [retrieved Oct. 21, 2008] retrieved from the Internet: <http://www.theindexer.org/files/24-2/24-2_075.pdf>.
Wong, R.K., et al., "Managing and Querying Multi-Version XML Data With Update Logging," 2002 Proc. of ACM Symposium on Document Engineering, DOCENG 2002, pp. 74-81, Nov. 8-9, 2002.
Lamb, J., "Embedded Indexing," The Indexer, [online] vol. 24, No. 4, Oct. 2005, pp. 206-209 [retrieved Oct. 21, 2008] retrieved from the Internet: <http://www.jalamb.com/>.

* cited by examiner

*Primary Examiner* — Rehana Perveen
*Assistant Examiner* — Scott A Waldron
(74) *Attorney, Agent, or Firm* — Patents on Demand P.A.; Brian K. Buchheit; Scott M. Garrett

(57) ABSTRACT

An index of data elements is stored with a file. The file encodes the data elements. The index indicates memory locations of the data elements within the file. The index and the file are stored in a storage device. A parser or decoder accesses the index to identify data elements. At least one of the storing and accessing are performed by a computing device.

23 Claims, 5 Drawing Sheets

PROCESSING ENCODED DATA ELEMENTS USING AN INDEX STORED IN A FILE

CROSS-REFERENCE TO RELATED APPLICATION

This application claims the benefit of European Patent Application No. 07114184.0, filed 10 Aug. 2007 and which is hereby incorporated by reference.

This application is a continuation of U.S. patent application Ser. No. 12/176,788, filed Jul. 21, 2008 and issued on Aug. 21, 2012 as U.S. Pat. No. 8,250,115, which is incorporated herein in its entirety.

BACKGROUND

In data processing systems, data is commonly encoded in a data format that facilitates the storage, processing, transmission and extraction of the data. With many such data formats, the encoded data needs to be processed in order to extract or decode the data for use by a user or other data processing system. Data extraction or decoding may be performed by a parser.

An example of a system for encoding data, commonly used in computer systems, uses a mark-up language such as Extensible Mark-up Language (XML). Parsers for mark-up language such as XML are commonly provided as Application Program Interfaces (APIs) and can generally be categorized as tree based or event based APIs. Tree based parser APIs map an XML document into an internal tree structure, and then allow another application, such as a web browser, to navigate that tree and extract the required data. Event-based parser APIs report parsing events, such as the start and end of data elements, directly via callbacks to another application such as a web browser, and do not usually build an internal tree. In both cases, the web browser that receives data encoded in XML uses the parser API to decode the XML. The XML may be supplied by a web server.

One problem with the above approaches is that they require significant memory or processor resources in order to perform the data extraction or decoding.

BRIEF SUMMARY

In one embodiment, an index of data elements are stored with a file. The file encodes the data elements. The index indicates memory locations of the data elements within the file. The index and the file are stored in a storage device. A parser or decoder accesses the index to identify data elements. The storing and/or the accessing are performed by a computing device.

Data is encoded as one or more data elements in accordance with a first data format. The encoded data is saved to a file in a storage device. An index of the data elements is created. The index indicates the locations of one or more of the data elements within the file. The index is embedded within the file or is appended to the file. At least one of the encoding, saving, creating, and embedding are performed by a computing device.

DETAILED DESCRIPTION OF THE INVENTION

Figure 1:
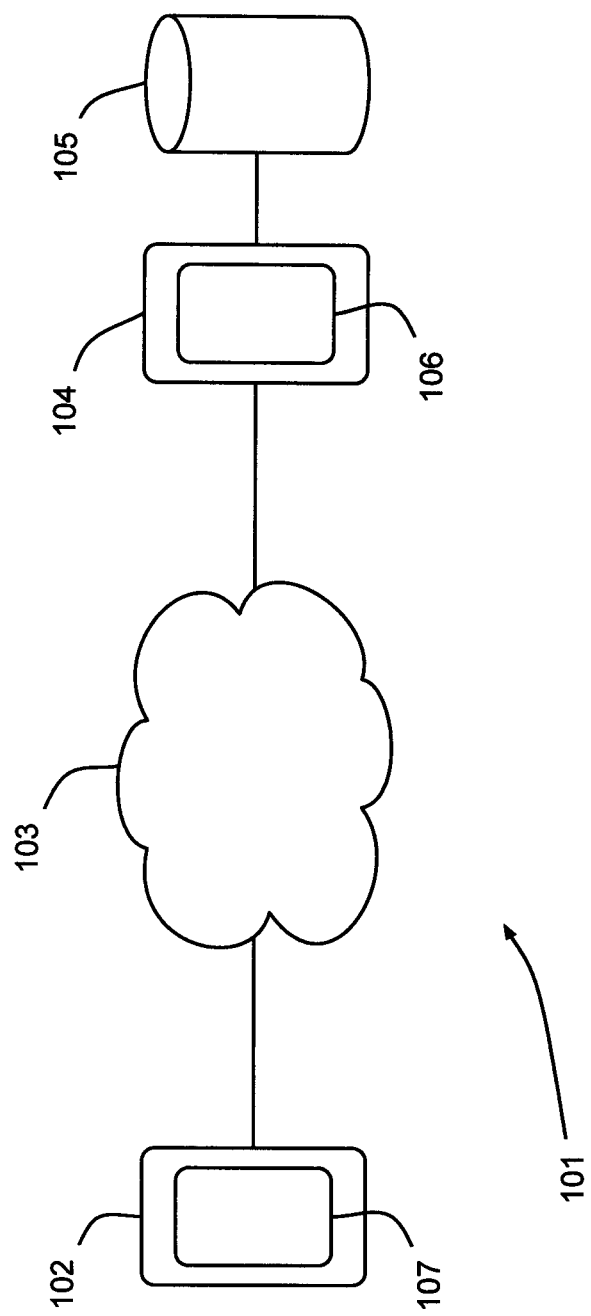
FIG. 1 is a schematic illustration of a computer system.

Data encoded as one or more data elements in a data format can be processed. The data format can be arranged for further processing by a parser to extract the encoded data elements. In the method, data can be encoded as one or more data elements in accordance with a first data format. The encoded data can be saved to a file. An index of the data elements can be created, where the index indicates the locations of one or more of the elements within the file. The index can be associated with the file. The index can be arranged to enable the extraction of the data elements directly from the file in memory. The index can be embedded in a part of the file that is not used by the parser for extraction of the data elements from the file.

The data format may be a meta data language in which meta data elements are associated with the data elements in the encoded data. The data format may be a mark-up language. The data format may be XML. The index may index the meta data elements to the respective locations of the associated data elements within the file. The index may be an offset index. The index may be embedded in a comment. The index may be appended to the encoded data in the file. The location of the index within the file may be indicated by data element in the file. An index entry may be created for each occurrence of each data element.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a presenting computer or entirely on the presenting computer or server. In the latter scenario, the presenting computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference to FIG. 1, a data processing system in the form of a computer system 101 includes a first computer 102 connected via a network 103 to a second computer 104. The second computer 104 is also connected to a database 105. The second computer 104 is provided with a database server application program 106 arranged to receive queries from the first computer 102 via a database query web page and to respond with appropriate data from the database 105. The first computer 102 is provided with a web browser client application program 107, which enables a user to view the database query web page provided by the database server application program 106.

Figure 2:
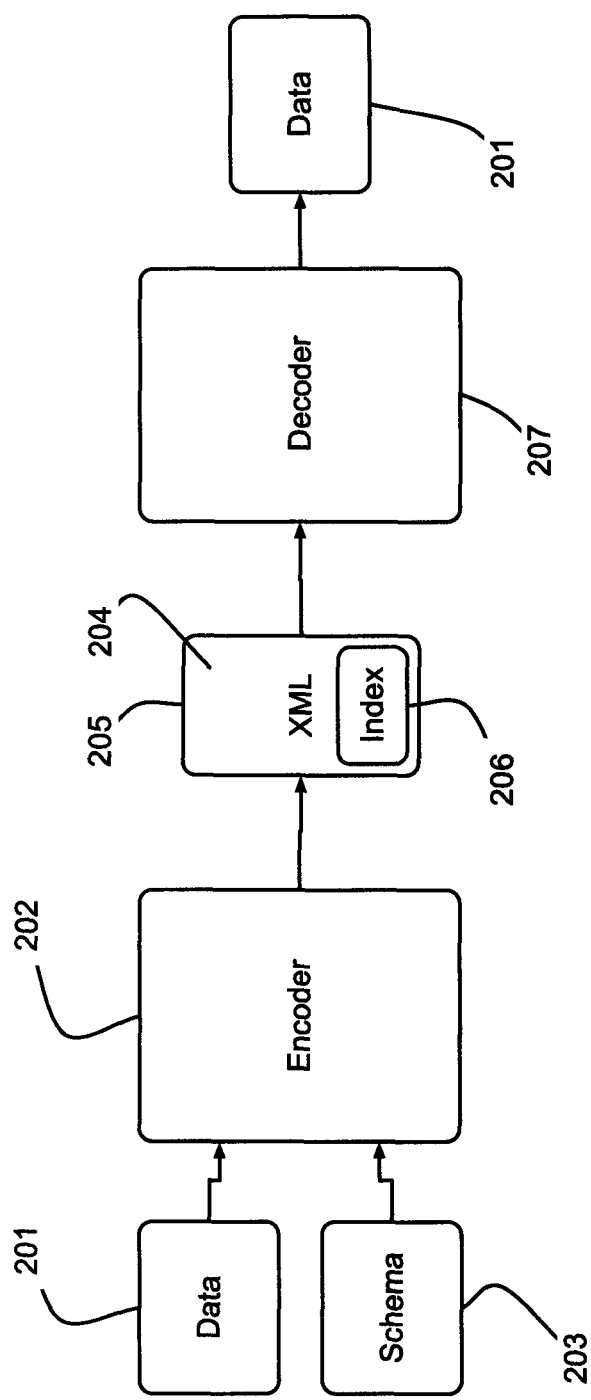
FIG. 2 is a schematic illustration of application programs performing processing in the computer system of FIG. 1.

With reference to FIG. 2, the data 201 provided by the database application program 106 is encoded as data elements in accordance with a data format in the form of a mark-up language. In the present embodiment, the mark-up language is Extensible Mark-up Language (XML). The database server application program 106 uses an XML encoding program 202 to encode data 201 that forms a response to a database query. The encoding program 202 encodes the data 201 in accordance with an XML schema 203, which defines how the data 201 is to be represented in XML. The encoding program 202 stores the encoded data 204 in a file 205. The encoding program 202 is further arranged to create an index 206 of the individual data elements in the XML encoded data 204. In the present embodiment, the index 206 indexes each of the XML tags in the encoded data 206 to their associated data elements. An example of the encoded data 204 and an associated index 206 will be described in further detail below. The web browser application program 107 on the first computer 102 uses an XML decoder 207 arranged to decode the XML encoded data 204 that comprises the database query results received from the second computer 104. The decoded data 201 is presented to the user via the web browser application program 107.

Figure 3:
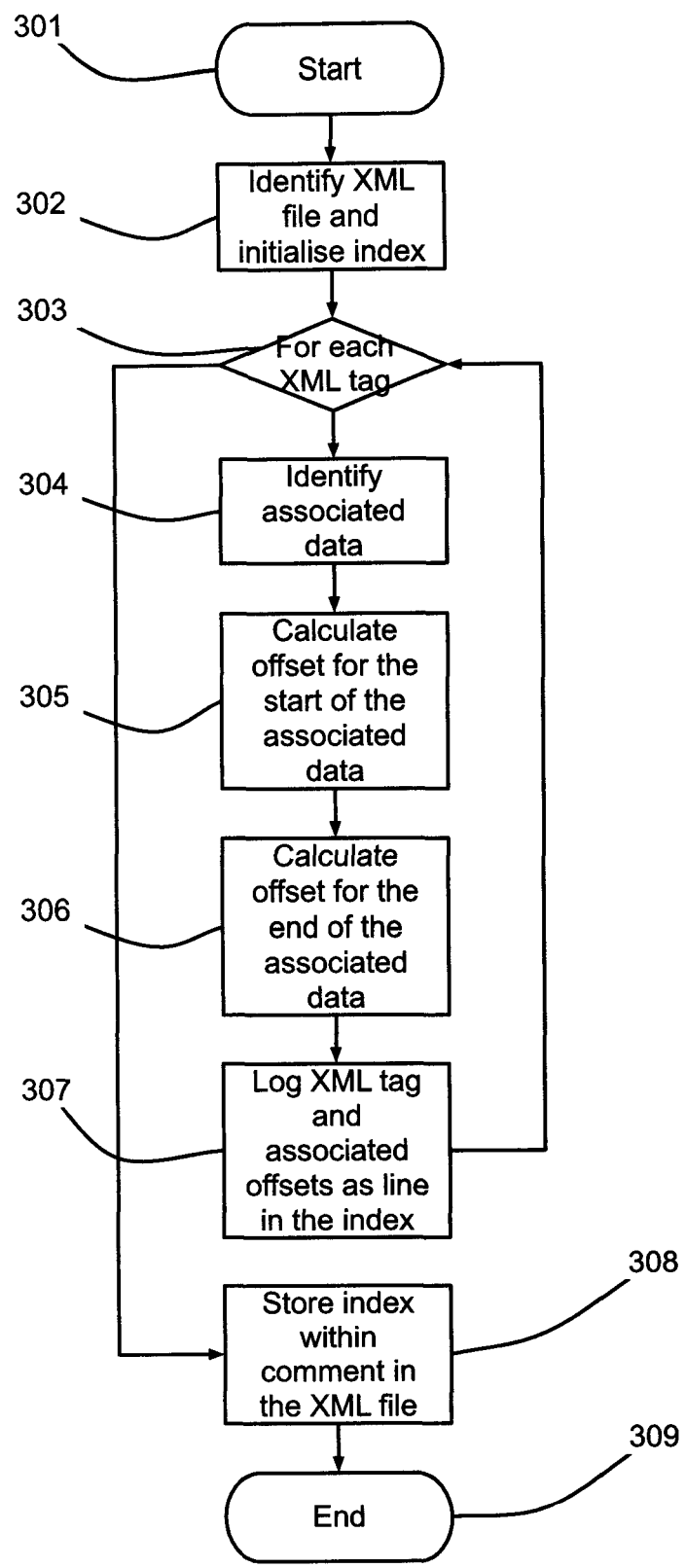
FIGS. 3 and 4 are flow charts illustrating processing performed by the application programs of FIG. 2.

The processing performed by the encoder 202 will now be described in further detail with reference to the flow chart of FIG. 3. Processing is initiated at step 301 by the database server application program 106 and processing moves to step 302. At step 302, the file 205 comprising the data 201 encoded in XML 204 is located and processing moves to step 303. At step 303, a loop condition is set to take each tag in the XML 204 in turn and perform the processing of steps 304 to 307 for each such tag. Processing first moves to step 304 where the data element associated with the given tag is identified and processing moves to step 305. At step 305, the number of characters between the start of the file 205 and the beginning of the data element is calculated. In other words, the character offset for the data element is calculated. Processing then moves to step 306 where the character offset of the end of the given data element is calculated. Processing then moves to step 307 where the XML tag and data element start and end offsets are logged in the index 206 and processing returns to step 303. The loop is performed until all of the XML tags in the XML 204 have been processed and logged in the index 206 as described above. At this point, processing moves from step 303 to step 308 where the index 206 is embedded in the file 205 by being enclosed within an XML comment and appended to the XML 204. Enclosing the index 206 within an XML comment ensures that the index 206 is carried with the XML 204 to which it applies without changing the standard manner in which XML may be processed or parsed. In other words, the index is embedded in a part of the file that is not processed by a parser when processing the XML 204 to extract the data 201.

Figure 4:
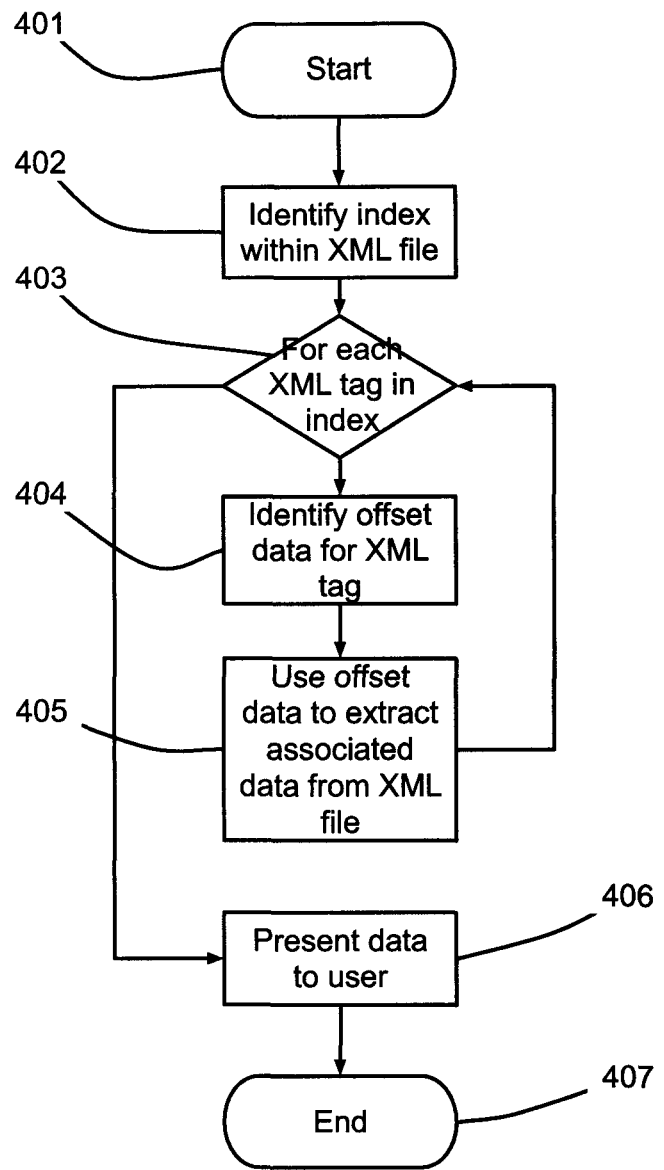

The processing performed by the decoder 207 will now be described in further detail with reference to the flow chart of FIG. 4. Processing is initiated at step 401, by the web browser application program 107 and processing moves to step 402. At step 402, the index 206 within the file 205 is identified and processing moves to step 403. At step 403, a loop condition is set up to apply steps 404 and 405 to each element in the index 206. Processing then moves through steps 404 and 405 for each entry in the index 206. At step 404, the offset data associated with the given tag is identified and processing moves to step 405. At step 405, the offset data is used to locate and extract the data element associated with the given tag within the XML encoded data 204. Once all of the entries in the index 206 have been processed as described above, processing moves from step 403 to step 406. At step 406, the extracted data 201 is presented via the web browser application program 107.

Figure 5:
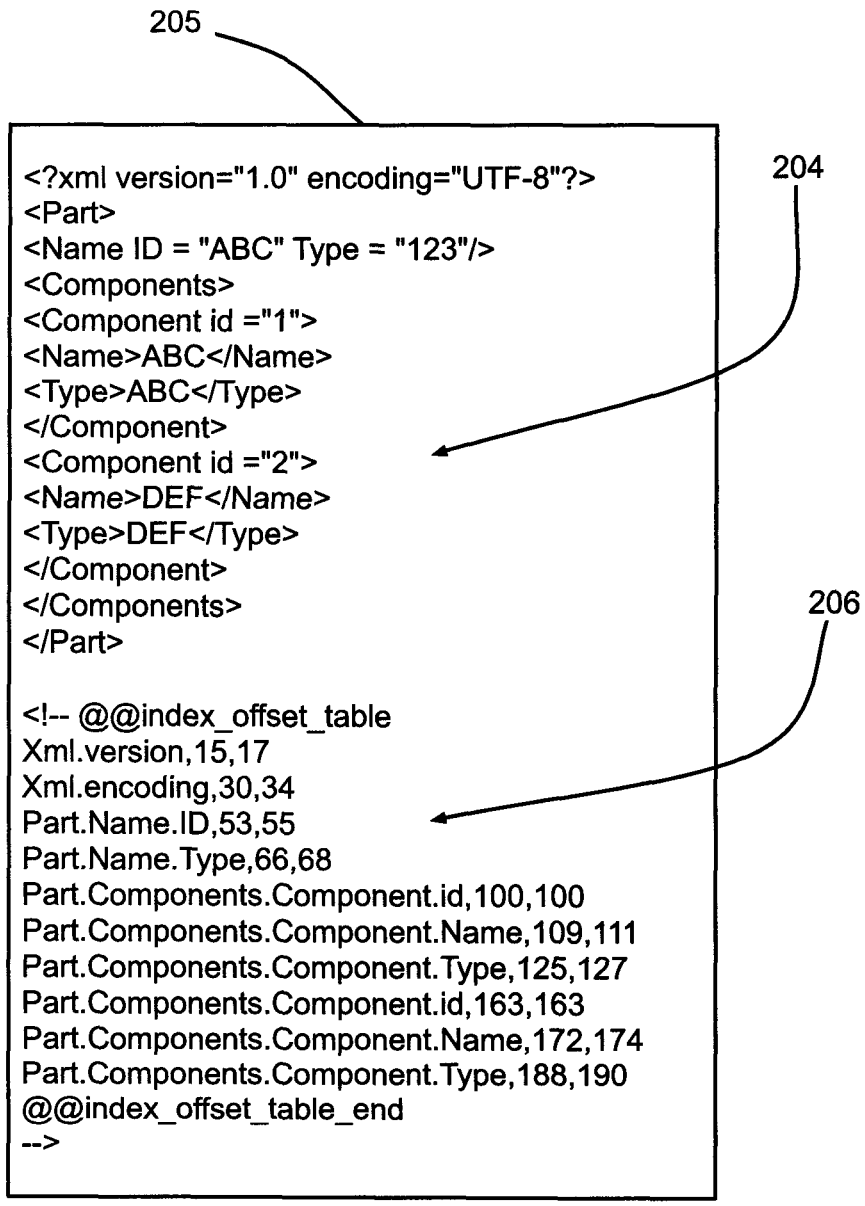
FIG. 5 is an example of data produced by the application programs of FIG. 2.

With reference to FIG. 5, an example of the contents of the file 205 comprises a section of data 201 encoded in XML 204 followed by an index 206 enclosed within an XML comment. The index 206 comprises an entry for each tag in the XML 204 indexed to offset data for the corresponding data element. The offset data comprises two numbers, the first being the character offset from the start of the file 205 to the start of the data element and the second being the character offset to the end of the data element. The comment also includes the label "@@index_offset_table" which is used by the decoder 207 for identifying the comment that comprises index 206.

As will be understood by those skilled in the art, with any data format where either the type or size of each data element is not known, the encoded data needs to be processed or parsed before the data can be used. Embodiments of the invention enable the data elements within the file to be identified and directly extracted from the file in memory by methods such as memory scanning, without the need to parse the entire encoded data file. The technique is thus applicable to any data format in which either the type or size of each data element is not known. Examples of such data formats include meta data languages and mark-up languages, for example, XML.

In another embodiment, the index is not stored within the file containing the data encoded in XML but is stored separately from the file and associated with the file by a reference within the file or by a predetermined filename or other referencing technique.

As will be understood by those skilled in the art, the index may comprise offset data defining the start and end location of each element or the start location and the length of each data element. Furthermore, the index may be embedded with a file in another non-parsed structure or a specifically provided data structure.

In a further embodiment, the index is placed at the beginning of the file. When the index is pre-pended, the index offsets need to account for the size of index, that is, the offsets need to be calculated relative to the start of the file or the end of the index. In another embodiment, the position of the index within the file is indicated by an entry at a predetermined position within the file so as to speed up the location of the index by the decoder.

In a further embodiment, the index is collated so as to provide a single entry for each element of meta data such as an XML tag. Thus, where multiple occurrences of an element are present, a single index references all such occurrences, in a similar manner to a book index. In another embodiment, the index is provided for a selected subset of all possible data elements. This would be useful, for example, when the writer of the index knows in advance that the reader is only concerned with a subset of the data elements.

In a further embodiment, a single application program is arranged to receive a file of data encoded in a given data format and to both index and decode the encoded data. In another embodiment, the index is cached in memory until the index needs to be written to non-volatile memory.

In a further embodiment, where the encoded data file has a common format with other such files, the index may be arranged for reuse. When the size of elements varies between files, padding may be provided within the common format so that a common index remains applicable. In another embodiment, when the data elements are amended, instead of generating a new index, just the entries in the index subsequent to the amended or deleted entries need have their offset position updated by the relative change in position.

It will be understood by those skilled in the art that the apparatus that embodies a part or all of the present invention may be a general purpose device having software arranged to provide a part or all of an embodiment of the invention. The device could be a single device or a group of devices and the software could be a single program or a set of programs. Furthermore, any or all of the software used to implement the invention can be communicated via any suitable transmission or storage means so that the software can be loaded onto one or more devices.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details representative apparatus and method, and illustrative examples shown and described. Accordingly, departures may be made from such details without departure from the spirit or scope of applicant's general inventive concept.

What is claimed is:

1. A method comprising:
    encoding, by an encoder, data as data elements according to a schema, wherein the schema comprises metadata elements associated with the data elements;
    creating, by the encoder, an index of the data elements;
    storing the index of the data elements within a file, said index indicating memory locations of the data elements within the file, said index and said file being stored in a storage device, wherein the index indexes the metadata elements to the corresponding memory locations of the data elements within the file; and
    accessing, by a parser or decoder, the index to identify the data elements, wherein at least one of the encoding, creating, storing and accessing are performed by a computing device.

2. The method of claim 1, further comprising:
    the parser or the decoder using the index to directly extract the data elements from the file without having to parse or decode the file.

3. The method of claim 1, wherein the parser or decoder does not access any part of the file other than the index to identify the data elements of the file.

4. The method of claim 1, further comprising:
    the parser or decoder reading a memory location of at least one element within the file from the index; and
    the parser or decoder decoding at the memory location for the at least one element without having to decode other portions of the file.

5. The method of claim 1, further comprising:
    creating a second index for the file; and
    appending the second index to the file or embedding the index in the file, wherein the creating and appending are performed by the computing device.

6. The method of claim 1, wherein the file is an extensible markup language file, and wherein the index is indicated within the file via an index specific markup tag.

7. The method of claim 1, wherein the index is embedded in a part of the file that is not used by the parser or decoder for extraction of the data elements from the file.

8. The method of claim 1, wherein the index is embedded in a comment section of the file.

9. The method of claim 1, wherein an index entry is created in the index for each occurrence of each data element in the file.

10. The method of claim 1, further comprising:
encoding data as the data elements in the file in accordance with a markup language; and
extracting a specific one of the data elements from the file using the index.

11. A method comprising:
encoding data as one or more data elements in accordance with a first data format, wherein the first data format comprises metadata elements associated with the data elements;
saving the encoded data to a file in a storage device;
creating an index of the data elements, the index indicating the memory locations of one or more of the data elements within the file, wherein the index indexes the metadata elements to the corresponding memory locations of the data elements within the file; and
embedding the index within the file, wherein the index is embedded in a part of the file that is not used by a parser or decoder for extraction of the data elements from the file, wherein at least one of the encoding, saving, creating, and embedding are performed by a computing device.

12. The method of claim 11, further comprising:
extracting the data elements from the file using the index.

13. The method of claim 11, wherein the index is an offset index.

14. The method of claim 11, further comprising:
accessing, by a parser or decoder, the index to identify the data elements, wherein the parser or decoder does not access any part of the file other than the index to identify the data elements of the file.

15. The method of claim 11, further comprising:
parsing or decoding, by a parser or decoder, using the index to directly extract data elements from the file without having to parse or decode the file.

16. The method of claim 11, wherein the index is embedded in a comment field of the file.

17. The method of claim 11, wherein the index indexes markup elements, wherein the markup elements correspond to the data elements.

18. A computer implemented system for processing data encoded as one or more data elements in a data format, said computer implemented system comprising a processor being operable to:
store an index of the data elements within a file, said data format comprising metadata elements associated with the data elements, said file encoding the data elements, said index indicating memory locations of the data elements within the file, said index indexes the metadata elements to the corresponding memory locations of the data elements within the file, said index and said file being stored in a storage device, wherein the index is embedded in a comment section of the file;
access the index to identify the data elements, wherein at least one of the storing and accessing are performed by a computing device.

19. The computer implemented system of claim 18, further comprising the processor being operable to:
parse or decode using the index to directly extract data elements from the file without having to parse or decode the file.

20. The computer implemented system of claim 18, wherein a parser or decoder does not access any part of the file other than the index to identify the data elements of the file.

21. A computer implemented system for processing data encoded as one or more data elements in a data format, said data format being arranged for further processing by a parser to extract said encoded data elements, said computer implemented system comprising a processor being operable to:
encode data as the one or more data elements in accordance with a first data format, wherein the first data format comprises metadata elements associated with the data elements;
save the encoded data to a file in a storage device;
create an index of the data elements, wherein the index indexes the metadata elements to the corresponding memory locations of the data elements within the file, the index indicating the locations of the one or more of the data elements within the file, wherein the index comprises offset data defining the start and end location of each data element; and
embed the index within the file or append the index to the file.

22. The system of claim 21, said computer implemented system comprising a processor being operable to:
extract the data elements from the file using the index.

23. The system of claim 21, wherein the index is embedded in a part of said file that is not used by the parser for extraction of the data elements from the file.

* * * * *